United States Patent [19]

Kohno

[11] Patent Number: 4,924,165
[45] Date of Patent: May 8, 1990

[54] SERVO CONTROL SYSTEM CARRYING OUT COARSE CONTROL AND FINE CONTROL

[75] Inventor: Keiichi Kohno, Yokohama, Japan

[73] Assignee: Fujitsu Limited, Kawasaki, Japan

[21] Appl. No.: 300,185

[22] Filed: Jan. 23, 1989

Related U.S. Application Data

[63] Continuation of Ser. No. 94,850, Sep. 10, 1987, abandoned.

[30] Foreign Application Priority Data

Sep. 10, 1986 [JP] Japan ................. 61-213005

[51] Int. Cl.$^5$ .................. G05B 11/18; G05B 5/01
[52] U.S. Cl. ........................ 318/592; 318/590
[58] Field of Search ............. 318/561, 592, 594, 603, 318/610, 616, 617

[56] References Cited

U.S. PATENT DOCUMENTS

| | | | |
|---|---|---|---|
| 3,721,882 | 3/1973 | Helms | 318/594 |
| 4,006,394 | 2/1977 | Cuda et al. | 318/594 X |
| 4,069,413 | 1/1978 | Rutledge et al. | 364/118 |
| 4,166,970 | 9/1979 | Cardot et al. | 318/594 X |
| 4,184,108 | 1/1980 | Sordello et al. | 318/594 X |
| 4,200,827 | 4/1980 | Oswald | 318/594 |
| 4,225,928 | 9/1980 | Ohkubo | 318/594 X |
| 4,429,267 | 1/1984 | Veale | 318/594 |
| 4,480,217 | 10/1984 | Robbins et al. | 318/561 X |
| 4,491,776 | 1/1985 | Veale | 318/617 X |
| 4,588,937 | 5/1986 | Fujioka et al. | 318/594 X |
| 4,589,061 | 3/1986 | Nordstrom | 318/594 |
| 4,647,826 | 3/1987 | Ota | 318/603 X |
| 4,647,828 | 3/1987 | Wachi | 318/603 |
| 4,810,941 | 3/1989 | Ohishi et al. | 318/592 X |

FOREIGN PATENT DOCUMENTS

| | | |
|---|---|---|
| 0105611 | 4/1984 | European Pat. Off. . |
| 0137659 | 4/1985 | European Pat. Off. . |
| 61-039275 | 2/1986 | Japan . |

*Primary Examiner*—Bentsu Ro
*Attorney, Agent, or Firm*—Staas & Halsey

[57] ABSTRACT

In a servo control system having a coarse control unit and a fine control unit, a differential gain is changed temporarily during a short period at an initial state of fine control to shorten a settling time and to reduce overshoot. The servo control system includes a controlled system including a controlled object and a drive unit, a unit for controlling a speed of the controlled object to move and position the same to or adjacent a reference position, and a unit having a differential control circuit and for controlling a position of the controlled object to position the controlled object to the reference position, after the speed control unit moves the controlled object to or adjacent to the reference position. A differential gain of the differential control circuit is selected from at least two values, a first of which is used at an initial state and a second of which is used after the initial state. The servo control system is applicable to a disc system, a printer, etc.

18 Claims, 9 Drawing Sheets

SERVO CONTROL SYSTEM CARRYING OUT COARSE CONTROL AND FINE CONTROL

This is a continuation of co-pending application Ser. No. 094,850 filed on Sept. 10, 1987, now abandoned.

BACKGROUND OF THE INVENTION

1. Field of the Invention

The present invention relates to a servo control system. More particularly, it relates to a servo control system first carrying out coarse (rough) control and thereafter changing to and carrying out fine control.

The present invention is applicable to a variety of fine position control systems, for example, a magnetic disc system, an optical disc system, a printer, or an industrial robot system.

2. Description of the Related Art

Servo control systems enable fine position control and thus have been extensively employed for a variety of control systems. In a servo control system, coarse control is applied, for example, speed control for moving a controlled object in a controlled system to a certain position adjacent to a reference position. Thereafter, fine control is applied, for example, a position control for fine position control of the controlled object at the reference position.

For example, in a magnetic disc system, coarse control, specifically, speed control, is used for a seek operation: for moving a magnetic head from a cylinder (or track) to a target cylinder. Thereafter, fine control, specifically, a position control, is used for fine position control of the magnetic head to a permissible position error region of the target cylinder. Normally, the position control may be carried out by a PID control algorithm. Control parameters for the PID control are adjusted to optimize the positional control to a steady state. Accordingly, when changing from speed control to position control, there is unavoidably a considerable large overshoot and/or undershoot. Thus, a considerably long settling time is required. This lengthens the operation time of the magnetic head. This will be described in more detail later with reference to a specific example.

SUMMARY OF THE INVENTION

An object of the present invention is to provide a servo control system reducing overshoot and/or undershoot and shortening the settling time at an initial state in a fine control mode just changed from a coarse control mode and maintaining fine position control in the steady state in the fine control mode after the initial state.

According to the present invention, there is provided a servo control system including: a controlled system including a controlled object to be position controlled and a drive unit driving the controlled object; a unit for controlling a speed of the controlled object through the drive unit to move and position the controlled object to a reference position; and a unit having a differential control circuit and for controlling a position of the controlled object through the drive unit to position the controlled object to the reference position, after the speed control unit moves the controlled object to a position adjacent to the reference position. A differential gain of the differential control circuit in the position control unit is selected from at least two values, a first of which is used at an initial state of the position control and a second of which is used after the initial state.

The first differential gain may be greater than the second differential gain, which is used for the fine position control of the controlled object.

The first differential gain may be set as large as possible to shorten the settling time and reduce overshoot and/or undershoot to the extent where oscillation of the controlled system is avoided and is used in a short period, again to avoid oscillation.

The servo control system may further include a master control unit, and a switching unit operatively connected among the controlled system, the speed control unit, and the position control unit. The master control unit energizes the switching unit to connect the controlled system and the speed control unit upon receipt of a control command and the reference position and gives a moving value between the reference position and a position of the controlled object to the speed control unit. The moving value is used for generating a speed reference. The master control unit issues a gain change signal for selecting the first differential gain to the position control unit. The master control unit deenergizes the switching unit to connect the controlled system and the position control unit when the controlled object reaches a position adjacent to the reference position and issues the reference position to the position control unit. The master control unit issues another gain change signal for selecting the second differential gain to the position control unit after the lapse a certain time.

The elapsed time may be a constant. Alternatively, the lapsed time may be the time by which the controlled object is positioned in a positioning range.

The differential control circuit may have an internal differential circuit differentiating a position signal indicating the position of the controlled object, an amplifier circuit amplifying the differential signal, another amplifier circuit amplifying a current signal indicating a drive current of the drive unit and the amplified differential signal, and adding the amplified current signal and the further amplified differential signal, and a gain change circuit.

The gain change circuit can change parameters of the differential circuit, the amplifier circuit, and/or the other amplifier circuit.

The servo control system can be applied to a magnetic disc system, an optical disc system, an serial printer, a plotter, and an industrial robot, etc.

BRIEF DESCRIPTION OF THE DRAWINGS

Other objects and features of the present invention will be described below in detail with reference to the accompanying drawings, in which.

DESCRIPTION OF THE PREFERRED EMBODIMENTS

Before describing the preferred embodiments of the present invention, an example of a prior art servo control system will be described with reference to the drawings for comparison purposes.

Figure 1:
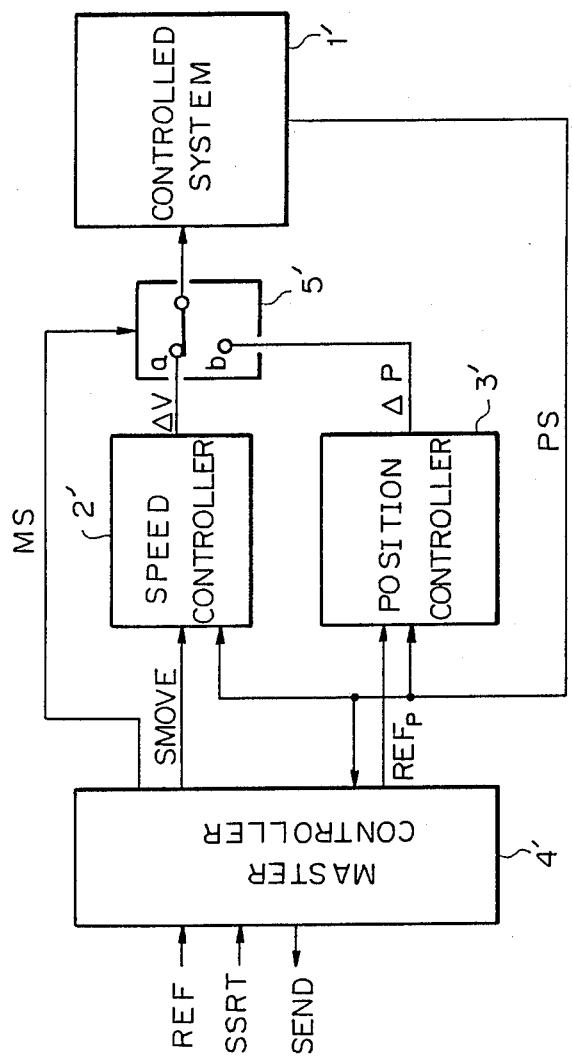
FIG. 1 is a block diagram of a prior art servo control system.

FIG. 1 is a block diagram of a prior art servo control system. The control system consists of a controlled system 1', a speed controller 2', a position controller 3', a master controller 4', and a switch circuit 5'. The controlled system 1' may include a motor for driving a controlled object, for example, a magnetic head in a magnetic disc system, a power amplifier receiving a speed control (error) signal $\Delta V$ from the speed controller 2' or a position control (error) signal $\Delta P$ from the position controller 3' through the switch circuit 5', amplifying the same, and supplying the amplified signal to the motor, and a position sensor providing a position signal PS indicating a position of the controlled object.

Referring to FIGS. 2a to 2f, the operation of the control system will now be described.

At a time t1', the master controller 4' receives a start signal SSRT (FIG. 2b), such as a seek command from error (or difference) $\Delta V = Vc - Vr$. The speed error $\Delta V$ is supplied as a speed error signal to the motor through the switch circuit 5' and the power amplifier in the controlled system 1', so that the controlled object is moved to the target track defined by the reference REF. The moved position of the controlled object is sensed by the position sensor in the controlled system 1'. The position signal PS is fed back to the speed controller 2'. The above closed-loop speed control may be continued until the speed of the controlled object reaches a predetermined low level, e.g., approximately zero speed. During the speed control, the master controller 2' receives the position signal PS, calculates the speed, and judges that the speed reaches the predetermined low level. The above speed control provides coarse control which moves the controlled object to a position adjacent to the target track, but cannot carry out fine position control at the target track.

Figure 2:
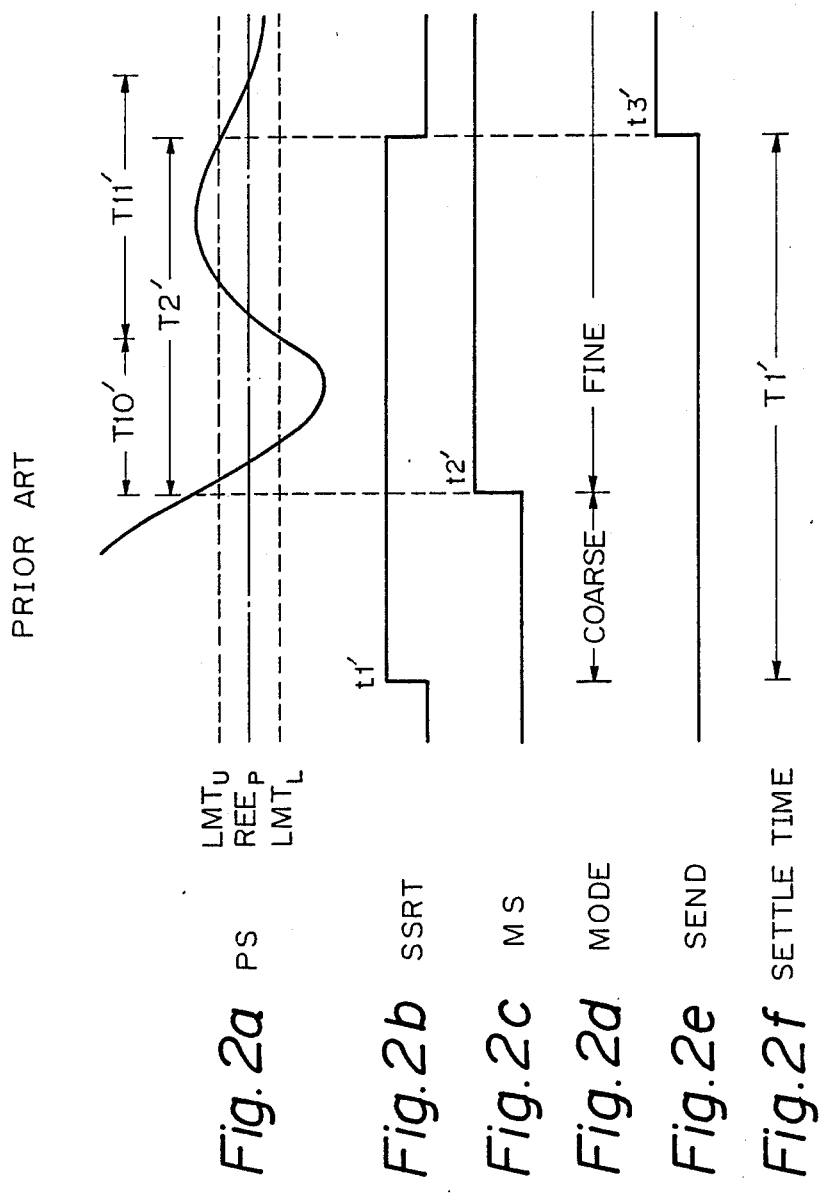
FIGS. 2a to 2f are graphs illustrating the operation of the servo control system shown in FIG. 1.

At a time t2', when the speed reaches the predetermined low level, the master controller 4' issues a reference position $REF_P$, i.e., the position of the target track, and changes the mode selection signal MS to high level (FIG. 2c) so as to connect the position controller 3' and the controlled system 1' through the switch circuit 5'. As a result, fine control i.e., position control by the position controller 3', starts (FIG. 2d). The position controller 3' normally has a PID control function and controls the controlled object to be finely positioned at the reference position $REF_P$. Finally, the position controller 3' finely controls the controlled object within an upper limit $LMT_U$ and a lower limit $LMT_L$. In a magnetic disc system, the upper limit $LMT_U$ is, for example, +0.8 $\mu$m with respect to the reference position $REF_P$, and the lower limit $LMT_L$ is, for example, $-0.8$ $\mu$m.

During the position control, the master controller 4' supervises the position signal PS and outputs a control end signal SEND (FIG. 2e) to the host controller at a time t3', where the position signal PS enters a permissible positioning range defined by the limits $LMT_U$ and $LMT_L$ (FIG. 2a). The host controller, for example, in the magnetic disc system, outputs a read command or a write command.

In the above, the settling time is a time T1' between the times t1' and t3' as shown in FIG. 2f. The settling time T1' indicates the seek time in the magnetic disc system.

In the above control system, control parameters of the PID control algorithm, more specifically, the proportional gain, integral gain, and differential gain of the closed-loop position control, are constants and are adjusted for optimal fine positioning of the controlled object in a steady state. Accordingly, the open-loop frequency characteristic is constant. As a result, as shown in FIG. 2a, in an initial state of the fine control, overshoot and undershoot become large, and accordingly, the settling time T1' becomes long. The settling time T2' (FIG. 2a) of the position control should especially be shortened.

Preferred embodiments of the present invention will now be described.

Figure 3:
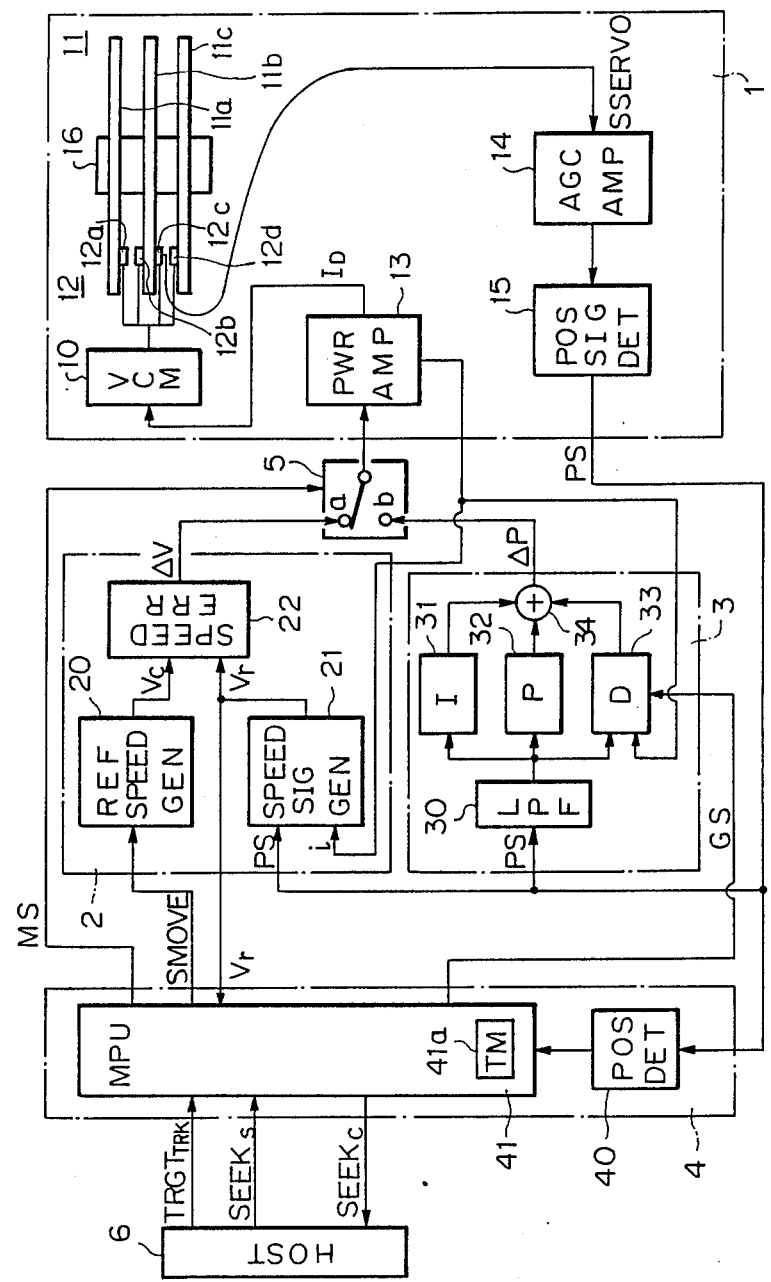
FIG. 3 is a diagram of an embodiment of a magnetic disc system according to the present invention.

Referring to FIG. 3, a first embodiment of a servo control system applied to a magnetic disc system will be described.

The magnetic disc system in FIG. 3 includes a magnetic head drive system 1, a speed controller 2, a position controller 3, a master controller 4 connected to a host controller 6, and a switch circuit 5.

The magnetic head drive system 1 includes magnetic discs 11 fixed on a rotary shaft 16, magnetic heads 12, a voice coil motor 10 driving the magnetic heads 12 in a radial direction of the magnetic discs 11, and a power amplifier 13 supplying a drive current $I_D$ to the voice coil motor 10. The magnetic head drive system 1 also includes an automatic gain control (AGC) amplifier 14 and a position signal detection circuit 15. A magnetic head 12c facing a low side of a center magnetic disc 11a, on which is stored servo signals at a predetermined pitch sufficient for fine positioning, reads a servo signal having a sine wave shape. The AGC amplifier 14 receives the servo signal SSERVO from the magnetic head 2c and performs the automatic gain control. The position signal detection circuit 15 receives an automatic-gain-controlled servo signal and outputs a position signal PS having a sine wave shape. The voice coil motor 10 has a linear operational characteristic. The power amplifier 13 outputs a current detection signal i corresponding to the drive current $I_D$ therefrom.

Figure 4:
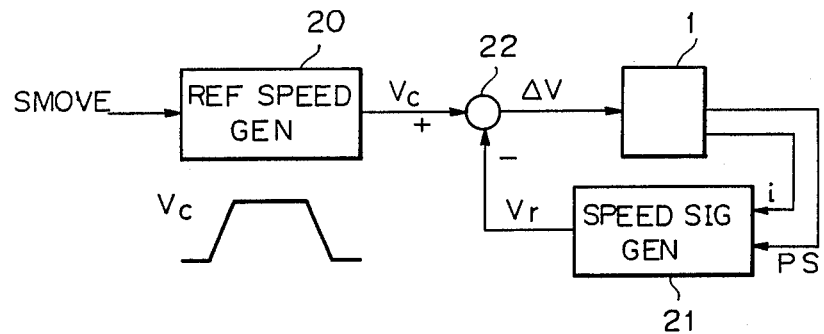
FIG. 4 is a block diagram of a speed control system shown in FIG. 3.

The speed controller 2 functions as a coarse position controller. The speed controller 2 includes a reference speed generation circuit 20, a speed signal generation circuit 21, and a speed error generation circuit 22. A block diagram of a feedback speed control system formed by the speed controller 2 and the magnetic head drive system 1 is given in FIG. 4. The reference speed generation circuit 20 receives a moving signal SMOVE which is a moving track(s) between a current track and a target track, calculated at the master controller 4, and generates a reference speed Vc having a trapezoidal shape and defined by the moving signal SMOVE and the operation characteristics of the magnetic head drive system 1. The speed signal generation circuit 21 receives the current detection signal i from the power amplifier 13 and the position signal PS from the position signal detection circuit 15 and generates an actual moving speed Vr of the magnetic head 2c. As the actual moving speed Vr is calculated on the basis of the combination of a speed obtained by differentiating the position signal PS and the current detection signal i, the actual moving speed Vr is guaranteed a high accuracy in a wide frequency range. This will be described in more detail in the description of the position controller 3. The speed error generation circuit 22 calculates a speed difference $\Delta V = Vc - Vr$ and outputs the same as a speed control signal to the power amplifier 13 through the switch circuit 5. The power amplifier 13 amplifies the speed control signal and supplies the drive current $I_D$ corresponding to the speed control signal to the voice coil motor 10. The voice coil motor 10 drives the magnetic heads 12 in response to the drive current $I_D$. The current detection signal i from the power amplifier 13 and the position signal PS from the position signal detection circuit 15 are fed back to the speed controller 2 to form a closed speed control system.

The position controller 3 functions as a fine position controller. The position controller 3 includes a low pass filter 30, an integration control circuit 31, a proportional control circuit 32, a differential control circuit 33, and an adder 34. The low pass filter 30 receives the position signal PS from the position signal detection circuit 15 and rejects a high frequency component contained in the position signal PS. The filtered position signal is supplied to the control circuits 31 to 33. Note that the servo signal from the magnetic head 2c indicates a positioned deviation of the magnetic head 2c with respect to a target track position, and thus the position signal PS substantially indicates a positional error $\Delta x$ with respect to the target track position. The proportional control circuit 32 receives the filtered position signal, i.e., the positional error $\Delta x$, and provides a proportional control signal $SC_P$ expressed by the following formula:

$$SC_P = K_P \Delta x \quad (1)$$

where, $K_P$ indicates a proportional constant.

The integration control circuit 31 also receives the positional error $\Delta x$ and provides and integration control signal $SC_I$ expressed by the following formula:

$$SC_I = K_I \int \Delta x \cdot dt \quad (2)$$

where, $K_I$ indicates an integration constant.

The differential control circuit 33 receives the positional error $\Delta x$ and the current detection signal i and provides a differential control signal $SC_D$ expressed by the following formula:

$$SC_D = K_D f(\Delta x, i) \quad (3)$$

where, $K_D$ indicates a differential constant, and $f(\Delta x, i)$ is an error function defined by $\Delta x$ and i.

The error function $f(\Delta x, i)$ is substantially the same as the calculation in the speed signal generator 21 and will be described in more detail with reference to the following drawings. The position controller 3 thus provides a PID control represented by the following control algorithm:

$$\Delta P = K_P \Delta x + K_I \int \Delta x \cdot dt + K_D f(\Delta x, i) \quad (4)$$

Figure 5:
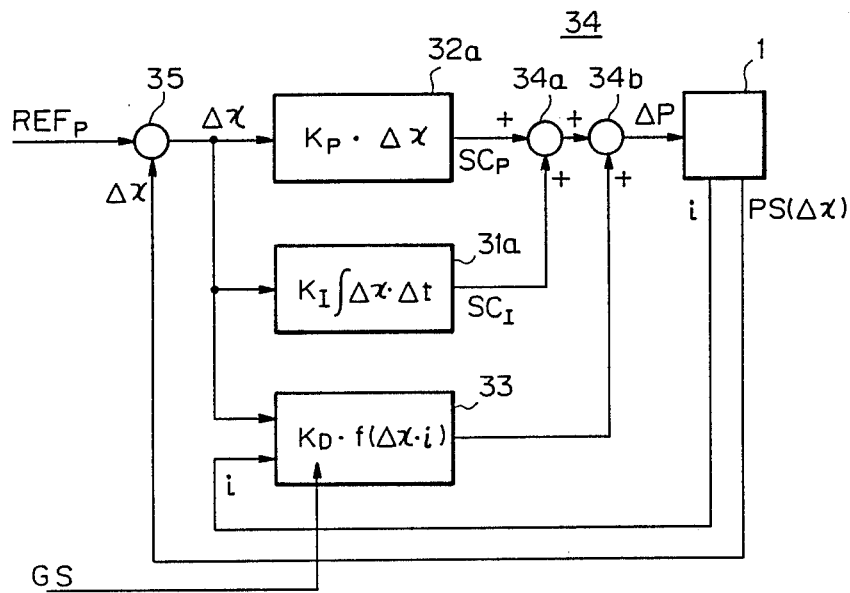
FIG. 5 is a block diagram of a position control system shown in FIG. 3.

A block diagram of the position control system formed by the position controller 3 and the magnetic head drive system 1 is shown in FIG. 5. The reference position $REF_P$ added to an addition point 35 is zero because the position signal PS, per se, indicates the positional error $\Delta x$. The control signals $SC_P$ and $SC_I$ are added at an addition point 34a and further added with the control signal $SC_D$ at an addition point 34b. As a result, the position controller 3 provides a position control signal $\Delta P$ expressed by the formula (4) to the magnetic head drive system 1 through the switch circuit 5. The power amplifier 13 receives the position control signal $\Delta P$ and amplifies the same and supplies the drive current $I_D$ corresponding to the position control signal to the voice coil motor 10. The voice coil motor 10 drives the magnetic heads 12 in response to the drive current $I_D$. The current detection signal i from the power amplifier 13 and the position signal PS, i.e., the position error $\Delta x$, from the position signal detection circuit 15 are fed back to the position controller 3 to form a closed position control system.

Clearly, the above-mentioned position control is merely of a fundamental PID position control. The feature of the embodiment is to change only the differential constant $K_D$ in the differential control circuit 33 in response to a gain change signal GS from the master controller 4. This gain change will be described later.

The master controller 4 includes a position detection circuit 40 and a microprocessor (MPU) 41 having a CPU (not shown), a RAM (not shown), a ROM (not shown), an input/output (I/O) port (not shown), and a timer 41a. The MPU 41 may be an INTEL 8031. The position detection circuit 40 receives the position signal PS indicating the servo information from the position signal detection circuit 15 and detects an actual position of the magnetic head 2c. The MPU 41 carries out seek control. The MPU 41 receives a seek command $SEEK_S$ and a target cylinder (or a target track) $TRGT_{TRK}$ through the I/O port. The MPU 41 also receives the actual position from the position signal detection circuit 15 and the actual speed Vr from the speed signal generation circuit 21 and calculates a magnetic head moving value as a moving signal SMOVE to the target track $TRGT_{TRK}$.

Referring to FIGS. 6a to 6g, an outline of the operation of the magnetic disc control system in FIG. 3 will be given.

Upon receipt of the seek command $SEEK_S$ and the target track $TRGT_{TRK}$ from the host controller 6 at a time t1 (FIG. 6b), the MPU 41 selects the speed control mode, i.e., the coarse control mode. The MPU 41 calculates the magnetic head moving value and supplies the moving signal SMOVE to the reference speed generation circuit 20. At the same time, the MPU 41 outputs a control mode change signal MS of a low level (FIG. 6c), to connect the speed control signal $\Delta V$ to the power amplifier 13.

Figure 6:
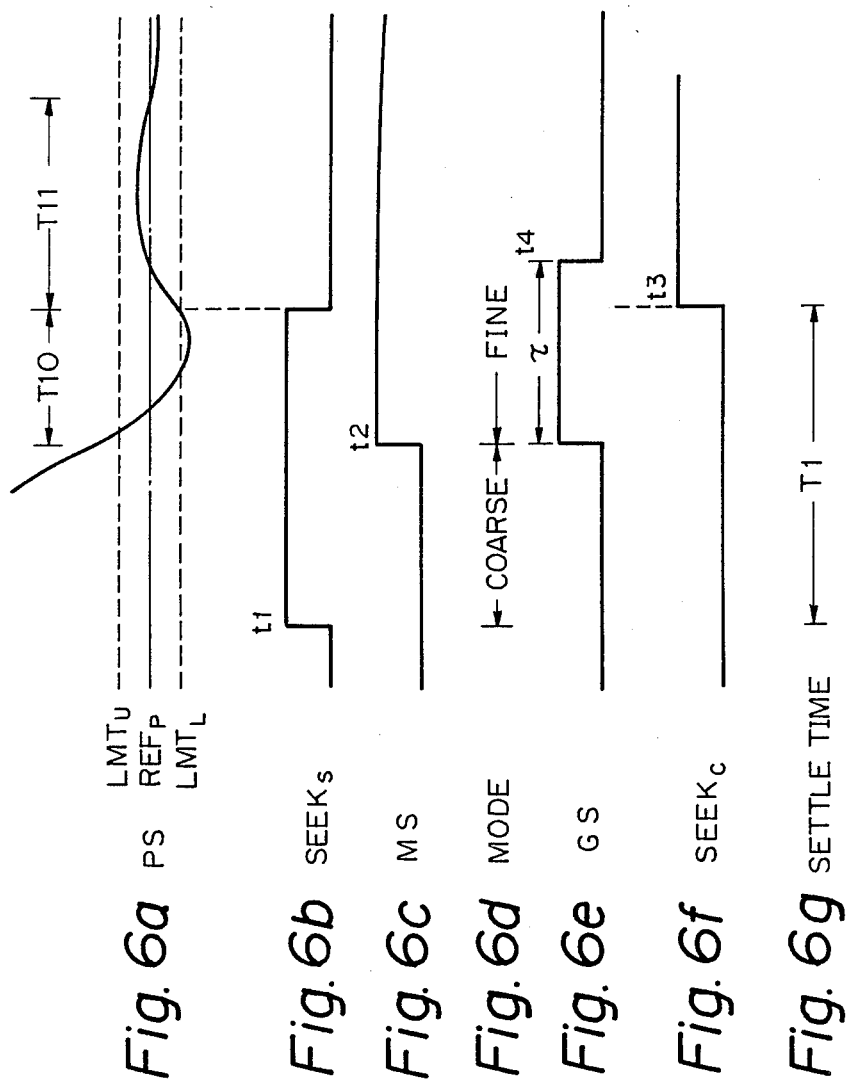
FIGS. 6a to 6g are graphs illustrating the operation of the magnetic disc system shown in FIG. 3.

When the actual speed Vr reaches a predetermined value, e.g., approximately zero, at a time t2, the MPU 41 initializes the position controller 3, more specifically, the integration control circuit 31. Simultaneously, the MPU 41 starts the timer 41a, outputs the gain change signal GS of a high level (FIG. 6e) to only the differential control circuit 33, and outputs the control mode selection signal MS of a high level (FIG. 6c) to connect the position control signal $\Delta P$ to the power amplifier 13 through the switch circuit 5. The timer 41a terminates after a lapse of a time $\tau$ from the time t2. Then, the MPU 41 changes the gain control signal GS to the differential control circuit 33 to a low level at a time t4 (FIG. 6e).

Before reaching the time t4, the magnetic head 2c can be positioned in a permissible position region between an upper limit $LMT_U$, for example, +0.8 μm with respect to a target track position (or a reference position) $REF_P$, and a lower limit $LMT_L$, for example, −0.8 μm, at a time t3. The MPU 41 outputs a seek completion signal $SEEK_C$ to the host controller 6. Then, the host controller 6 may request a read access or a write access.

As mentioned above, the feature of the present invention is to temporarily change only the differential control gain $K_D$ during the time τ (FIG. 6e) in an initial state of the position control mode. Reasons of the change and effects thereof will be described.

The PID control algorithm represented by the formula (4) can be rewritten as the following formula:

$$\Delta P = k\{\Delta x + 1/T_I \int \Delta x \cdot dt + T_D \cdot f(\Delta x, i)\} \quad (5)$$

where, indicates a loop gain, $T_I$ indicates an integral time, and $T_D$ indicates a differential time.

Figure 7:
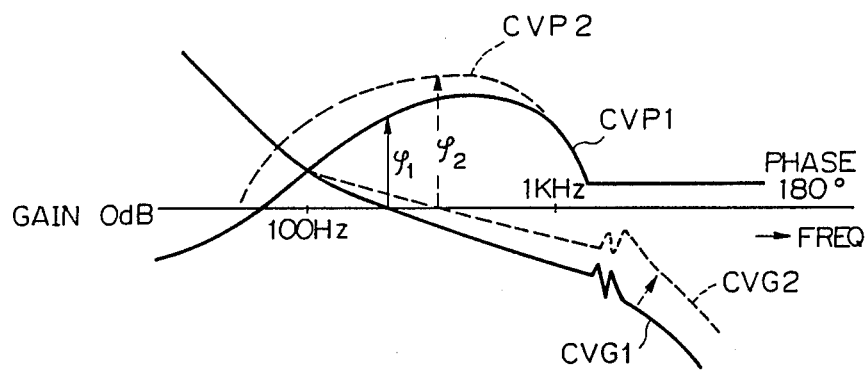
FIG. 7 is a graph representing the operational characteristics of the magnetic disc system shown in FIG. 3.

To reduce the overshoot and/or undershoot as shown in FIG. 2a and shorten the settling time T1' shown in FIG. 2f or the settling time T2' in FIG. 2a, it is conceivable to increase the loop gain k in the formula (5). This may contribute to improvement of the response in a certain range. However, the increase of the loop gain k results in a parallel shift of the gain curve in the entire frequency range in a Bode diagram. Accordingly, a sufficient phase margin $\Psi_1$ shown in FIG. 7 cannot be obtained. FIG. 7 is a schematic Bode diagram. In FIG. 1, curve CVG1 represents the gain, and curve CVP1 represents the phase. A small phase margin $\Psi_1$ causes instability of the control system. Then, this approach cannot be adopted in a magnetic disc control system.

The open loop frequency characteristic is essentially determined by the differential gain $K_D$. Therefore, it may also be considered to reduce the overshoot and/or undershoot and shorten the settling time T1' or T2' by increasing only the differential gain $K_D$. However, the differential gain $K_D$ can only be increased to the extent where no oscillation is generated in the magnetic head drive system 1, more concretely, the voice coil motor 10 at a resonance frequency thereof in a high frequency. That is, in order to avoid oscillation, the differential gain $K_D$ cannot be made too large. In particular, the differential gain $K_D$ cannot be large at all times in the entire frequency range. The differential gain $K_D$ must be optimized in a steady state to ensure fine position control in the steady state, where read or write access can be effected.

The present invention increases the differential gain $K_D$ only during the time τ (FIG. 6e) in the initial state of the position control to reduce the overshoot and/or undershoot and to shorten the settling time and restores the differential gain $K_D$ to the optimum value for the steady state control.

The time τ is, for example, 3 ms, sufficiently small for avoiding oscillation. When the differential gain $K_D$ is increased the gain curve of the PID control is lifted only in the high frequency range, as shown by the dotted curve CVG2 from curve CVG1 in FIG. 7. As a result, a phase margin $\Psi_2$ is increased and becomes greater than the phase margin $\Psi_1$. This ensures the improvement of the stability. In FIG. 7, curve CVP2 represents a phase when the differential gain $K_D$ is increased. In other words, at the initial state of the position control, the frequency of the servo signal is relatively low, and thus no oscillation is generated. After that, the differential gain $K_D$ is restored, thus the optimum control can be maintained in a high frequency range.

Figure 8:
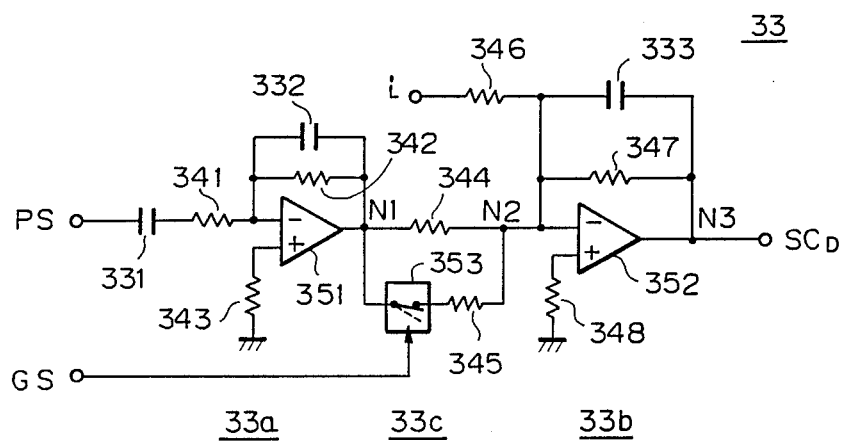
FIG. 8 is a circuit diagram of a differential control circuit shown in FIG. 3.

The gain changeable differential control circuit 33 is shown in FIG. 8. In FIG. 8, the differential control circuit 33 includes a differential circuit 33a consisting of a capacitor 331 having a capacitance C1, a resistor 341 having a resistance R1, an operational amplifier 351, a bias resistor 343 having a resistance R3, a feedback resistor 342 having a resistance R2, and a feedback capacitor 332 having a capacitance C2. The differential control circuit 33 also includes a gain change circuit 33b consisting of a switch 353, a resistor 344 having a resistance R4, and a resistor 345 having a resistance R5. The differential control circuit 33 further includes an addition circuit 33c consisting of an input resistor 346 having a resistance R6, an operational amplifier 352, a bias resistor 348 having a resistance R8, a feedback resistor 347 having a resistance R7, and a feedback capacitor 333 having a capacitance C3.

The position signal PS is differentiated by a differentiator of the series-connected capacitor 331 and the resistor 341. When the position signal PS has a voltage Vi, a voltage $V_{N1}$ at a node N1 is defined by the following formula:

$$V_{N1} = -C1 \cdot R2 \cdot \frac{dVi}{dt} = \alpha \cdot \frac{dVi}{dt} \quad (6)$$

The addition circuit 33c adds the current detection signal i supplied to the resistor 346 and the differentiated position signal supplied to a node N2 through the resistor 344 and outputs the differential control signal $SC_D$ at a node N3. The combination of the differentiated position signal and the current detection signal i ensures reliability of control over a wide frequency range.

When a gain change signal GS of a high level is supplied to the switch 353, the switch 353 is closed to connect the resistor 353 to the resistor 344 in parallel. Then the parallel resistance R45 is $(R4 \times R5)/(R4 + R5)$. An amplification factor a1 of the addition circuit 33b for the voltage VN1 is $$a1 = \frac{R7}{R45} = \frac{R4 + R5}{R4 \times R5} R7 \quad (7)$$

Another amplification factor a2 for the current detection signal i is constant and is expressed by the following formula:

$$a2 = R7/R6 \quad (8)$$

Accordingly, the differential control circuit 33 provides the differential control signal $SC_D$ when the gain change signal GS of high level is supplied at the initial rate:

$$\begin{aligned} SC_D &= a1 \cdot V_{N1} + a2 \cdot i \\ &= a1 \cdot (R2) \cdot C1 \cdot \frac{dVi}{dt} + a2 \cdot i \end{aligned} \quad (9)$$

On the other hand, the amplification factor a1 is changed to a1' when the gain change signal GS of a high level is removed at the steady state:

$$a1' = R7/R4 \quad (10)$$

The differential control signal $SC_D$ is $$SC_D = a1' \cdot V_{N1} + a2 \cdot i \quad (11)$$

Since a1 is greater than a1', the differential gain $K_D$ combined with a1 and a2 when the gain change signal GS of a high level is supplied is greater than the differential gain $K'_D$ when the gain change signal GS of a high level is removed.

For example, when R4=68 kΩ, R5=100 kΩ, R6 —220 kΩ, and R7=27 kΩ, a1 is approximately 0.66, a2 is approximately 0.12, and a1' is approximately 0.4.

Other parameters are as follows:
R1: 2.2 kΩ
R2: 100 kΩ
R3: 1 kΩ
R8: 15 kΩ
C1: 3000 pF
C2: 120 pF
C3: 1820 pF The differential time of the capacitor 331 and the resistor 341 is approximately 6.6 μs.

Figure 9:
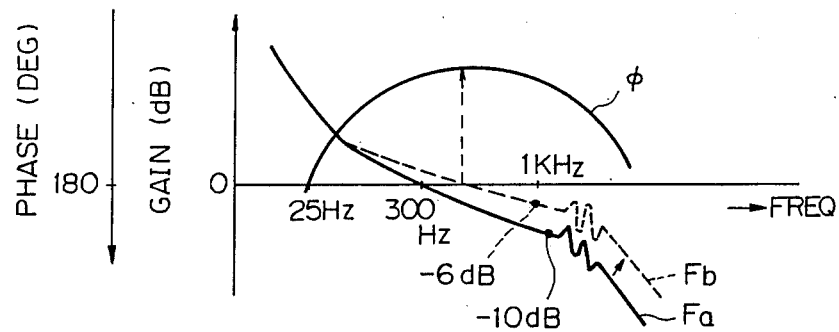
FIG. 9 is a graph representing the operational characteristics when the differential control circuit of FIG. 3 is used.

In FIG. 9, curve Fa represents a gain, i.e., the open loop frequency characteristic when the switch 353 is opened. Curve Fb represents the open loop frequency characteristic when the switch 353 is closed at the initial state of the position control. φ represents a phase characteristic.

In the case of the above parameters, the time T10 in FIG. 6a is approximately 1.0 to 1.5 ms and the time T11 is approximately 3 to 6 ms. The time T11 is substantially equal to a time T11' in FIG. 2a. Accordingly, compared with the prior art, the settling time for the position control is shortened to T10 from the time T2' in FIG. 2a. Also, the seek time, i.e., a settling time of the speed control and position control, is also shortened to T1, shown in FIG. 6g, from the time T1', shown in FIG. 2f. The undershoot is reduced, as shown in FIG. 6a. No overshoot is generated.

After elapse of the time τ shown in FIG. 6e, approximately 3 ms, the differential gain is restored to the optimum value in the steady state.

The MPU 41 can output the gain change signal GS when the magnetic head 2c reaches the permissible region between the upper limit $LMT_U$ and the lower limit $LMT_L$ and a position change with time is small, instead of waiting for the time τ to elapse by the timer 41a.

A variety of modifications of the gain changeable differential control circuit can be used.

Figure 10:
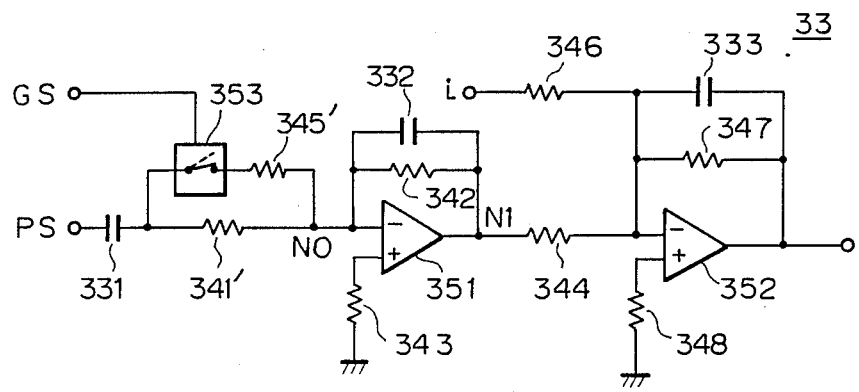
FIGS. 10 to 12 are circuit diagrams of other types of the different control circuit shown in FIG. 3.

Referring to FIG. 10, the differential coefficient α in the formula (6) can be changed by changing the resistance of the differential circuit of the capacitor 331 and resistors 341' and 345'. When the resistance R1' of the resistor 341' is equal to the resistance R1=2.2 kΩ, the resistance R5' of the resistor 345' is 6.6 kΩ.

Figure 11:
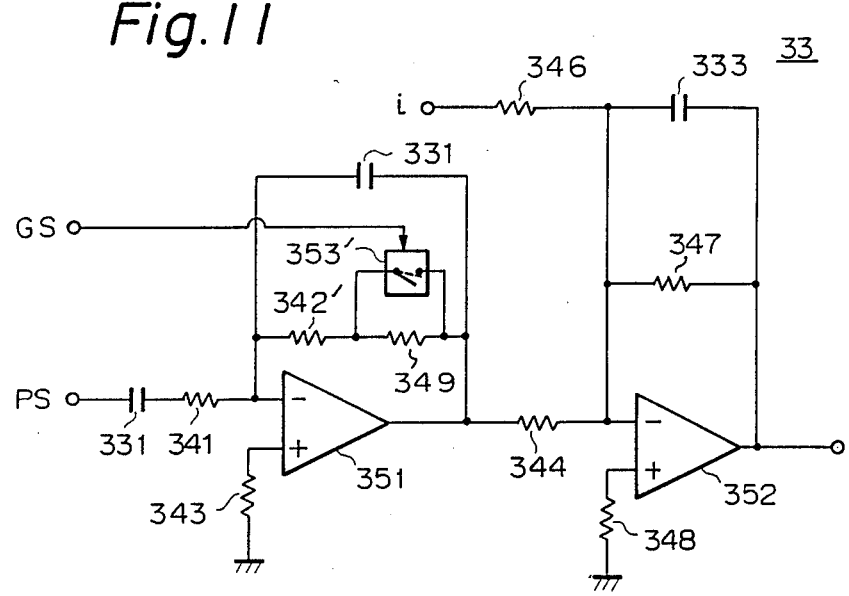

Referring to FIG. 11, the feedback resistor of the amplifier 351, consisting of a resistor 342' having a resistance R2' and a resistor 349 having a resistance R9, can be changed. A switch 353' is reversely energized. In the initial state of the position control, the resistor 349 is connected to the resistor 342' in series. The resistor 349 is bypassed in the steady state. By changing the feedback resistor, the amplification factor of the amplifier 351 is changed. The change of the amplification factor is substantially equal to the change of the differential coefficient α. When R1=2.2 kΩ and R2'=100 kΩ, R9 is 65 kΩ.

Figure 12:
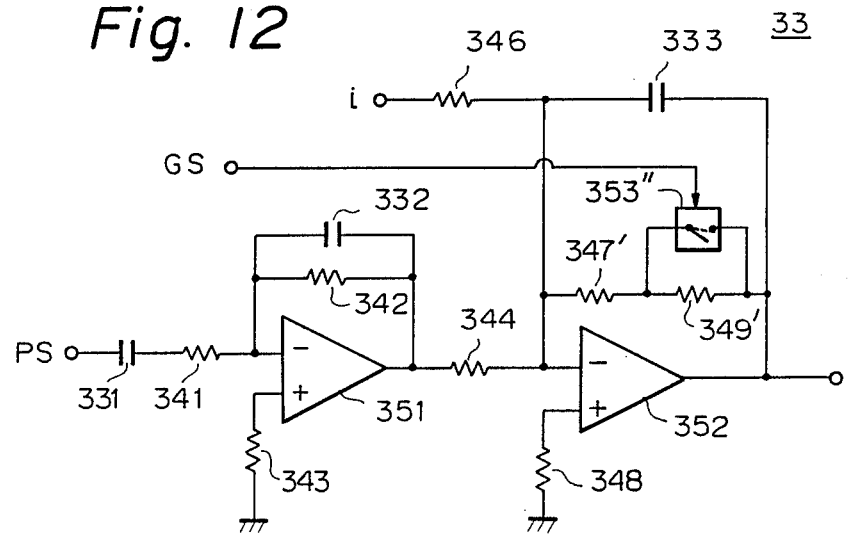

Referring to FIG. 12, the feedback resistor of the amplifier 352, consisting of a resistor 347' having a resistance R7' and a resistor 349' having a resistance R9', can be changed. As a result, the amplification factors a1, a2, and a1' in the formulas (7), (8), and (10) are changed to the following formulas, respectively:

$$a1 = \frac{R7' + R9'}{R4} \quad (11)$$

$$a2 = \frac{R7' + R9'}{R6} \quad (12)$$

$$a1' = \frac{R7'}{R4} \quad (13)$$

$$a2' = \frac{R7'}{R6} \quad (14)$$

a2 is the amplification factor for the current detection signal i in the initial state of the position control. a2' is the amplification factor in the steady state.

In the above embodiments, the speed controller 2 and the position controller 3 can be realized by a digital signal processor of high speed or the like.

The above embodiments can be easily applied to head positioning of an optical disc system, head positioning of a serial printer, positioning of an industrial robot system, positioning a plotter, etc.

Figure 13:
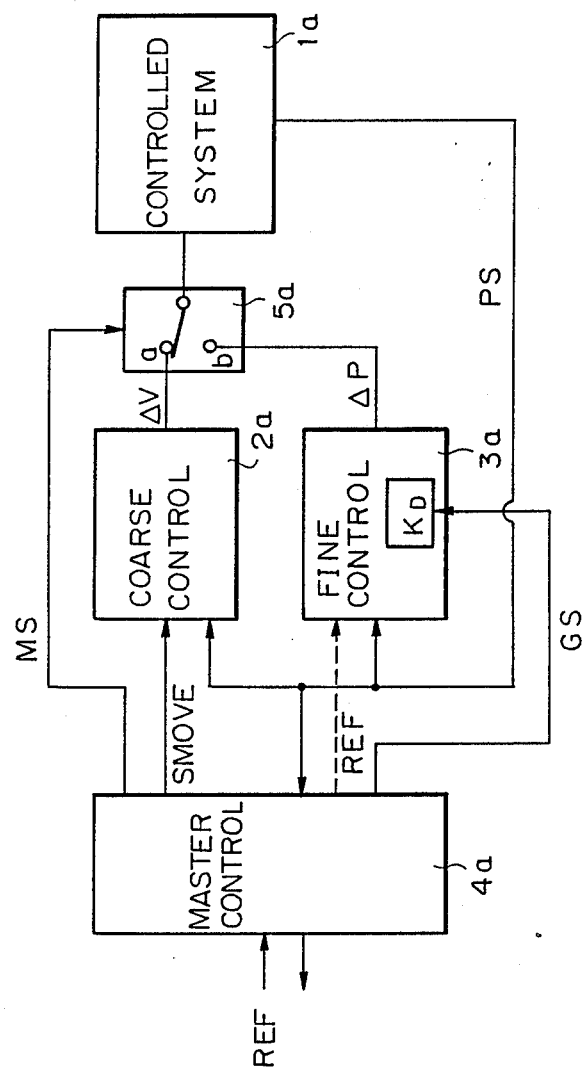
FIG. 13 is a block diagram of a servo control system according to the present invention.

FIG. 13 shows a general control system with a changeable differential gain $K_D$. The master controller 4a is optional in the present invention. In general, the fine controller 3a receives the reference position REF.

In addition, the position control may be realized by not only PID control but also PD control, or ID control.

The differential gain can be changed not only twice, but three times or more. Especially, in a control system where the settling time is considerably long due to large inertia of the controlled system, a plurality of steps of gain change in a transient state are preferable.

Many widely different embodiment of the present invention may be constructed without departing from the spirit and scope of the present invention. It should be understood that the present invention is not limited to the specific embodiments described in this specification, except as defined in the appended claims.

I claim:
1. A servo control system comprising:
   a controlled system including:
     a controlled object to be position controlled;
     a drive unit driving said controlled object;
     speed control means, connected to said drive unit, for controlling the speed of said controlled object through said drive unit to move and position said controlled object to one of a reference position and a position adjacent to the reference position; and
   position control means, having differential control means, for controlling a position of said controlled object through said drive unit to position said controlled object at said reference position after the speed control means moves said controlled object to one of the reference position and the position adjacent to said reference position, a differential gain of said differential control means in said position control means being selected from at least two values, a first value being used at an initial state during a coarse control mode of position control by said position control means and a second value being used at an initial state during a fine control mode of said position control, said fine control node being controlled for a predetermined time for minimizing undershoot and overshoot of said controlled object during a transient state from the speed control by said speed control means to the position control by said position control means, and reducing a settle time for said controlled object.

2. A servo control system according to claim 1, wherein said first value of differential gain is greater than said second value of differential gain.

3. A servo control system according to claim 2, wherein said first value of differential gain is set as large as possible to shorten the settling time and reduce overshoot and undershoot, to an extent avoiding oscillation of said controlled system, and is used in a short period avoiding said oscillation.

4. A servo control system according to claim 1, further comprising:
master control means; and
switching means operatively connected among said controlled system, said speed control means, and said position control means,
said master control means energizing said switching means to connect said controlled system and said speed control means upon receipt of a control command and a signal representing said reference position, and issuing a moving value to said speed control means, said moving value is used for generating a speed reference,
said master control means issuing a gain change signal for selecting said first value of differential gain to said position control means,
said master control means deenergizing said switching means to connect said controlled system to said position control means for said predetermined time when said controlled object reaches a position adjacent to said reference position and issuing said reference position to said position control means,
said master control means issuing another gain change signal, for selecting said second value of differential gain, to said position control means after elapse of said predetermined time.

5. A servo control system according to claim 4, wherein said predetermined time is a constant.

6. A servo control system according to claim 4, wherein said predetermined time is a time by which said controlled object is positioned in a positioning range.

7. A servo control system according to claim 1, wherein said differential control means includes:
a differential circuit differentiating a position signal indicating a position of said controlled object;
a first amplifier circuit amplifying the differential signal;
a second amplifier circuit amplifying a current signal of said drive unit and the amplified different signal;
a gain change circuit operatively connected between said first and second amplifier circuits; and
an adding circuit, operatively connected to said first and second amplifier circuits, for adding said amplified current signal and said amplified differential signal.

8. A servo control system according to claim 7, wherein said gain change circuit changes a differential coefficient of said differential circuit in response to a state change.

9. A servo control system according to claim 7, wherein said gain change circuit changes an amplification factor of said first amplifier circuit in response to a state change.

10. A servo control system according to claim 7, wherein said gain change circuit changes a differential coefficient of said differential circuit and an amplification factor of said first amplifier circuit in response to a state change.

11. A servo control system according to claim 7, wherein said gain change circuit changes an amplification factor of said second amplifier circuit in response to a state change.

12. A servo control system according to claim 1, wherein
said controlled object is a head of a disc control,
said controlled system comprises a head control unit including said head to be position controlled and a motor for driving said head,
said speed control means for controlling the speed of said head through said motor moves and positions said head within a predetermined range around a target track position,
said position control means, having said differential control means, for controlling the position of said head through said motor uses a servo signal sensed by said head to position said head to said target track position, after said speed control means moves said head to within the predetermined range around said target track position.

13. A servo control system according to claim 12, further comprising:
master control means; and
switching means operatively connected along said head control unit, said speed control means, and said position control means,
said master control means energizing said switching means to connect said head control unit and said speed control means upon receipt of a seek command and a signal representing said target track position, and issuing a moving value to said speed control means, said moving value is used for generating a speed reference,
said master control means issuing a gain change signal for selecting said first value of differential gain to said position control means,
said master control means deenergizing said switching means to connect said head control unit to said position control means when said head reaches a position adjacent to said target track position,
said master control means outputting a seek completion signal when said head is positioned in a predetermined positioning range, and
said master control means outputting another gain change signal for selecting said second value of differential gain to said position control means after elapse of said predetermined time.

14. A servo control system according to claim 12, further comprising a magnetic disc system including a magnetic head.

15. A servo control system according to claim 12, further comprising an optical disc system.

16. A servo control system, comprising:
a controlled system including a controlled object to be position controlled and a drive unit for driving said controlled object;
speed control means for controlling the speed of said controlled object through said drive unit to move and position said controlled object to a reference position;
differential means for differentiating a position signal for indicating a position of said controlled object and outputting a differential signal;
integral means for integrating said position signal and outputting an integration signal;
adding means for adding said differential signal from said differential means, said integration signal from said integral means, and said position signal; and
control means for controlling the position of said controlled object to move to said reference position, said controlling of said control means being carried out after said controlled object is moved to the position adjacent to said reference position by said speed control means.

17. A servo control system according to claim 16, wherein said differential means comprises switching means for switching a differential gain of said differential means.

18. A servo control system, comprising:
speed error generation means for generating a speed error signal based on a position signal from a controlled object;
position error generation means for receiving and adding a differential signal of said position signal, an integration signal of said position signal, and said position signal to generate a position error signal;
control means for switching from a coarse control mode for driving said controlled object by said speed error signal to a fine control mode for driving said controlled object by said position error signal; and
differential means for obtaining said differential signal of said position error generation means having a variable gain, the gain of said differential means being increased for a predetermined period of time from a point at which said control means switches from said coarse control mode to said fine control mode.

* * * * *